United States Patent
Huggett et al.

(10) Patent No.: US 8,564,399 B2
(45) Date of Patent: Oct. 22, 2013

(54) INTRINSICALLY SAFE VIBRATION AND CONDITION MONITORING SYSTEM AND THE PARTS THEREOF

(75) Inventors: Raymond Huggett, Oxfordshire (GB); David Mellor, Surrey (GB)

(73) Assignee: Aktiebolaget SKF, Göteborg (SE)

( * ) Notice: Subject to any disclaimer, the term of this patent is extended or adjusted under 35 U.S.C. 154(b) by 828 days.

(21) Appl. No.: 12/308,361

(22) PCT Filed: Jun. 22, 2007

(86) PCT No.: PCT/EP2007/005513
§ 371 (c)(1),
(2), (4) Date: May 17, 2010

(87) PCT Pub. No.: WO2007/147612
PCT Pub. Date: Dec. 27, 2007

(65) Prior Publication Data
US 2010/0231348 A1   Sep. 16, 2010

(30) Foreign Application Priority Data

Jun. 23, 2006  (EP) .................................... 06012991

(51) Int. Cl.
G05B 23/02   (2006.01)

(52) U.S. Cl.
USPC ........................................ 340/3.42; 702/188

(58) Field of Classification Search
USPC ............ 340/3.3, 3.31, 3.32, 3.4; 702/188, 80, 702/109, 118, 121, 122
See application file for complete search history.

(56) References Cited

U.S. PATENT DOCUMENTS

| 2003/0130810 A1 | 7/2003 | Smulders |
| 2003/0212511 A1 | 11/2003 | Carle |
| 2007/0093800 A1* | 4/2007 | Wham et al. .................... 606/34 |

FOREIGN PATENT DOCUMENTS

JP   57 139629 A   8/1982

* cited by examiner

*Primary Examiner* — Nabil Syed
(74) *Attorney, Agent, or Firm* — Bryan Peckjian; SKF USA Patent Group

(57) ABSTRACT

A vibration protection and condition monitoring system with true digital signal processing based design, with very limited analog based general signal conditioning and integrated specific sensor conditioning and sensor power supply options. In addition to the support for common Eddy Current Probe Systems (employing an external Driver), the device also supports direct connection of the Eddy Current Probe to the module, due to an built-in driver and linearization functionality. The system is a distributed system where the vibration protection and at least a part of the condition monitoring is in an intrinsically safe (IS) distributed unit located on or at the rotating machinery, even in hazardous areas.

13 Claims, 7 Drawing Sheets

INTRINSICALLY SAFE VIBRATION AND CONDITION MONITORING SYSTEM AND THE PARTS THEREOF

TECHNICAL FIELD

The invention concerns vibration protection and condition monitoring systems, especially in hazardous zones.

BACKGROUND

Eddy Current Probe (ECP) sensor systems have been used since the 1970's for non-contact displacement measurements, in the monitoring and protection of rotating machines operating with journal (sleeve) bearings. ECP systems are also commonly known as "Proximity Probe Systems".

In many businesses/industries, such as the oil & gas business, a machine is designated a 'hazardous area' with respect to flammable gases—divided into different 'zones' of ignition or similar. There are many requirements to be fulfilled to enable placement of sensors and electronics in a hazardous area. Conventionally only the sensor, such as an eddy current probe sensor and an appropriate oscillator or even driver is placed on and in close proximity to a rotating machine to be monitored. Individual cabling from each sensor has then been laid to a safe area, usually a control room, where vibration and condition monitoring systems have resided. This could be seen as inflexible. There thus seems to be room for improvements.

SUMMARY

The field is instrumentation systems for the monitoring of vibration on critical turbo-machinery in the energy sector, for the purposes of automatic shutdown and long-term equipment health (condition) monitoring.

An object of the invention is to define a unit and a method of enabling efficient vibration and condition monitoring in hazardous areas.

The aforementioned objects are achieved according to the invention by a method of combining a vibration protection system and a condition monitoring system in an intrinsically safe module for a zone 1 or equivalent environment. The module comprises protection functions and at least two communication line connections to a central unit. According to the invention the method comprises the step of giving absolute priority to the vibration protection system part.

Suitably the method further comprises the step of only activating one communication line at a time for transmission. Preferably the method further comprises the step of bit encoding high priority messages transferred on a communication line. Bit encoding being meant to be understood as encoding a message on a bit level instead of on a byte, word or higher level to keep the priority messages as short as possible. Suitably the method also further comprises the step of preconfiguring the module with a plurality of full configurations and the step of selecting, by the central unit by a compact message, which preconfigured full configuration that is to be used. A full configuration includes a complete setup of the module including input setup, alarm setup, a selection of linearization libraries etc.

The aforementioned objects are also achieved according to the invention by a vibration protection and condition monitoring system arranged to monitor at least one rotating part by means of measurements from at least one eddy current probe. The rotating part is located in a hazardous zone. According to the invention the system comprises a distributed unit locally to the at least one rotating part. The distributed unit comprises the vibration protection system being arranged to process the measurements digitally to thereby create an alarm signal and being arranged to digitally transfer the alarm signal by means of at least a doubled digital data bus communication line to a machine shutdown controller. The distributed unit further comprising at least a part of the condition monitoring system.

In some embodiments the distributed unit is arranged to be located in a Zone 1 environment or the equivalent, and the at least one rotating part is located in a Zone 1 environment or the equivalent, and the machine shutdown controller is located in a safe Zone. Preferably the distributed unit gives absolute priority to the vibration protection system part. This enables the protection part to react within set time limits and still keep the clock of the processing unit low, to thus keep power consumption low, to thus enable a intrinsically safe (IS) distributed unit. To further enhance this, in some embodiments the distributed unit only activates one communication line at a time for transmission. To even further enhance this, in some systems the system bit encodes high priority messages transferred on a communication line. To keep communication as low as possible and since there is no local access in a hazardous area, in some embodiments the distributed unit is preconfigured with a plurality of library sets, and in that the system selects which preconfigured library set or sets that are to be used by a compact message. Any of the above features may be combined in any desired manner.

The aforementioned objects are further achieved according to the invention by a vibration monitoring system arranged to monitor at least one rotating part by means of measurements from at least one eddy current probe. According to the invention the system comprises a distributed unit locally to the at least one rotating part. The distributed unit is arranged to process the measurements digitally to thereby create an alarm signal. The distributed unit is further arranged to digitally transfer the alarm signal by means of a at least doubled digital data bus communication line to a machine shutdown controller.

In the event of excessive vibration levels, the invention provides a instant shut-down command via a digital data-bus link to an external Distributed Control System (DCS) device, in order to stop the machine, or via direct opto-isolated digital output. The digital signals can be read directly by the DCS, or converted to a relay output in the safe area. The value of the vibration level—per sensor—is also transmitted to the DCS by the same data-bus link, using a proprietary protocol through the hazardous areas, and then translating to a public protocol in the safe area. For long-term health monitoring the Condition Monitoring System (CMS) for is divided: data acquisition occurs in the Zone 1, or equivalent, area along with the VMS, and then digitized data is sent across a second data-bus link to the safe area, where it is processed, and then to computer software for storage & display. The protocol for this link is proprietary.

Measurement Type. Either a displacement, velocity or an acceleration.

'Detection' Type. Each measurement must be defined as (usually) a peak-to-peak, peak or RMS value.

Frequency Range. Each measurement may be over a broad band of frequencies, or at a specific frequency.

Output Type. The device output may be a static or dynamic voltage or current, or may be a digital protocol.

The invention is also to pre-load firmware of a single vibration monitoring module hardware device with multiple, pre-defined, channel and alarm configuration schemes. Each scheme is specific to a particular application or, for example, machine model from a given manufacturer. Which scheme to use would be set at a factory (using software over a communication link) and hence the device is ready to use on installation.

If desired, subsequent changes in the field—without the need for hardware changes—can be implemented using the same physical communication link and proprietary communication protocol of dedicated software or write access—using a standard communication protocol—to select another predefined configuration.

The invention is achieved by means of a true digital signal processing based design, with very limited analog based general signal conditioning and integrated specific sensor conditioning and sensor power supply options. In addition to the support for common Eddy Current Probe Systems (employing an external Driver), the device also supports direct connection of the Eddy Current Probe to the module, due to an built-in driver and linearization functionality. When available in an intrinsically safe (Zone 1) version, the device requires no further isolation or protection measures (e.g. zener barriers or galvanic isolators). Specific sensor signal conditioning therefore is not dependent on hardware, but only on embedded software (firmware). The invention enables full sensor input support in an I.S. environment. Not only the common sensor input types from Accelerometer, Velocity sensor or Eddy Current probe system, but also direct input for eddy current probes for both vibration and/or speed measurements. According to the invention there are only limited hardware deviations. A single hardware platform is a major advantage in maintaining the product with respect to intrinsic safety approval. The fact that the embedded software (firmware) is predominantly responsible for the modules functionality this leads to high flexibility within the limits of the IS requirements. The invention enables simplified maintenance. For both end-user and manufacturer the product maintenance is much easier with limited number of versions. Spare parts, module inter-changeability and the option to re-configure an existing unit for a different sensor system type and/or application are advantages for the system end-user.

Another principal limitation in the operational concept of other eddy current probe measurement systems is that it is not feasible to use long distances with coaxial cable between probe and the final signal conditioning—i.e. a direct connection from the probe mounted in the machine to a centrally located monitoring system, perhaps several hundred meters away. The present operational principles limit this distance to around 15 meters. Hence it is common practice to utilize a 'stand-alone' driver to perform the required conditioning within the acceptable distance.

Other systems could be said to have some disadvantages. Analog design eddy current probe systems use an analog "driver" to perform the necessary steps in-between the probe and the monitor. The variations in parameters such as probe size, cable length, cable parameters, etc. are accommodated by 'specially tuned' derivatives of a standard analog component range. This leads to many different components, which cannot be easily interchanged, between different eddy current drive systems. A commercial impact of such 'tuning' is that, in general, the probe, cable and driver must be all from the same manufacturer. For digital drivers there are known techniques that improve flexibility of a single eddy Current probe system design (as opposed to the component variety of the fixed parameter based analog design). Once a linearization curve has been established for an eddy current probe system, the system in general remains static. Subsequently, the available signal processing power, used to establish the curve, remains unused but the component cost remains. Also the cost of analog to digital conversion, digital signal processing and then digital to analog conversion (to allow interfacing with standard, analog input based, monitoring and protection systems) would result in a commercially non-competitive product compared to proven analog designs.

Other advantages of this invention will become apparent from the detailed description.

BRIEF DESCRIPTION OF THE DRAWINGS

The invention will now be described in more detail for explanatory, and in no sense limiting, purposes, with reference to the following figures, in which.

DETAILED DESCRIPTION

Figure 1:
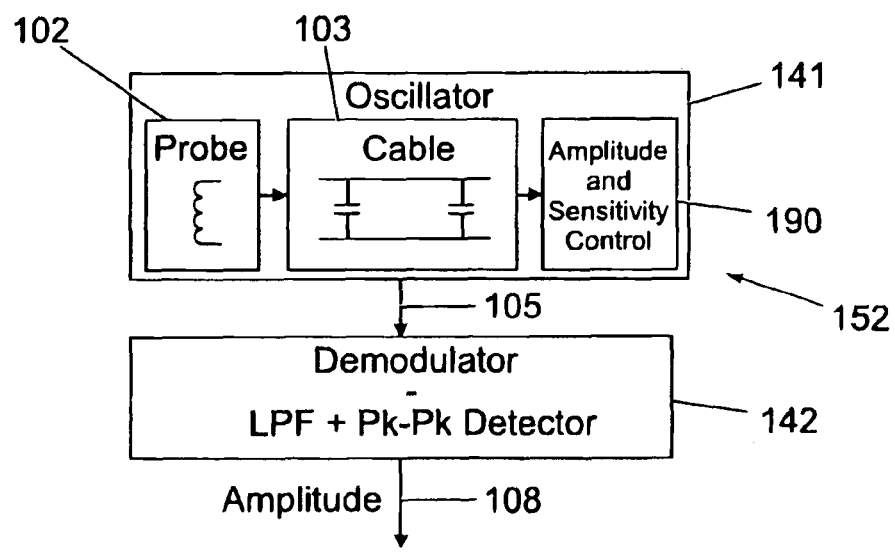
FIG. 1 illustrates a block diagram of a novel driver.

In order to clarify the method and device according to the invention, some examples of its use will now be described in connection with FIGS. 1 to 7.

Instrumentation systems for the monitoring of vibration on critical machinery for the purposes of automatic shut-down and long-term equipment health, condition monitoring, requires vibration sensors mounted on the machinery. Most common are radial displacement probes such as eddy current probes, which need an analog oscillator/demodulator unit, often known as a "driver" or "proximitor". Other types of probes are "Seismic" sensors that measure surface vibration in either acceleration or displacement, and often do not require a driver.

A driver will comprise an oscillator used to excite the attached eddy current probe so that it can generate a changing magnetic field. This magnetic field, when in close range to a steel target material, will induce time changing eddy currents in the surface of the target material. These eddy currents, in turn, will generate a magnetic field that will oppose the originating field and therefore affecting the resulting impedance of the probe tip. The probe impedance change is therefore a direct measurement of the distance between the probe tip and the target material. This non-contact method can therefore be utilized for measurement of position/distance/gap (average DC component) and vibration of target machine axis (AC component).

The oscillator output peak to peak voltage level will be a measure of the distance between probe and target, and the low frequency amplitude changes (envelope) will be a measure of the distance changes over time and thus represent target vibrations. The demodulator output will eliminate high frequency components and establish a high precision peak to peak detector that will be used as basic input for further digital processing according to the invention.

The present invention also includes a shift into the digital domain, which offers the required flexibility to allow for automatic compensation and linearization options according to the invention with the objective to eliminate any need for manual calibration and restrictions within fixed hardware solutions for compensation and linearization (as used in current full analog designs). Taking into account a digital design core for hardware control and signal post-processing (linearization of the non-linear probe impedance response), the system concept is used for the driver system according to the invention.

To accommodate for various cable lengths per probe type, resulting in different maximum impedance responses of the probe/cable assembly, driver oscillator operation is based upon using the longest cable length as reference for linearization process and use of external compensation capacitors and/or impedance matching networks to allow use of shorter cable length. The main purpose for compensation is to obtain equal impedance response of actual cable length opposed to the reference cable length for the infinite gap measurement response. With this in mind the driver oscillator can be optimized for a single impedance range that will suit multiple probe types and cable lengths, and thus take advantage of optimum dynamic input range. Furthermore, the oscillator design is optimized to allow for independent control for both amplitude level and impedance measurement sensitivity (amplification linearity in dependence on impedance). These parameters can then be digitally controlled and used for optimizing design for different probe types. Naturally, the oscillator circuit is restricted by the boundary conditions for oscillation of feedback loop unity gain (1) and feedback loop 0° phase shift opposed to output signal. These boundary conditions need to apply for the fully anticipated impedance range of probe/cable to maintain required excitation oscillation.

The novel oscillator is a low current circuit design to meet Intrinsic Safety approval for zone 1, or equivalent. Any mention to a specific hazardous zone classification such as zone 1 is according to zone 1 or according to an equivalent classification such as class 1 division 1. There is no manual range calibration requirement, and there is a high level of module interchangeability—'one module supports all probes' concept. However, tuning is possible to compensate for resistive loading of probe/cable tank impedance circuit by the oscillator circuit.

FIG. 1 illustrates a driver 152 comprising a novel oscillator circuit 190. The circuit 190 forms one part of the complete oscillator circuit 141 which also comprises a probe 102 and a cable 103. Following the output of the oscillator 105 is a high-speed peak-peak detector 142 to convert the dynamic high frequency output signal into a DC voltage output signal 108 representing the gap between probe and target and the superimposed shaft vibration signal (low frequency up to 10 kHz). A driver 152 commonly comprises the demodulator, the low pass filter and the peak to peak detector 142 function and the oscillator 141. This driver 152 comprising the oscillator circuit and demodulator and peak to peak detector 142, can be used in a stand alone configuration where the output signal 108 is transferred to a central processing place, or it can be integrated with distributed digital processing means according to the invention as described later.

Figure 2:
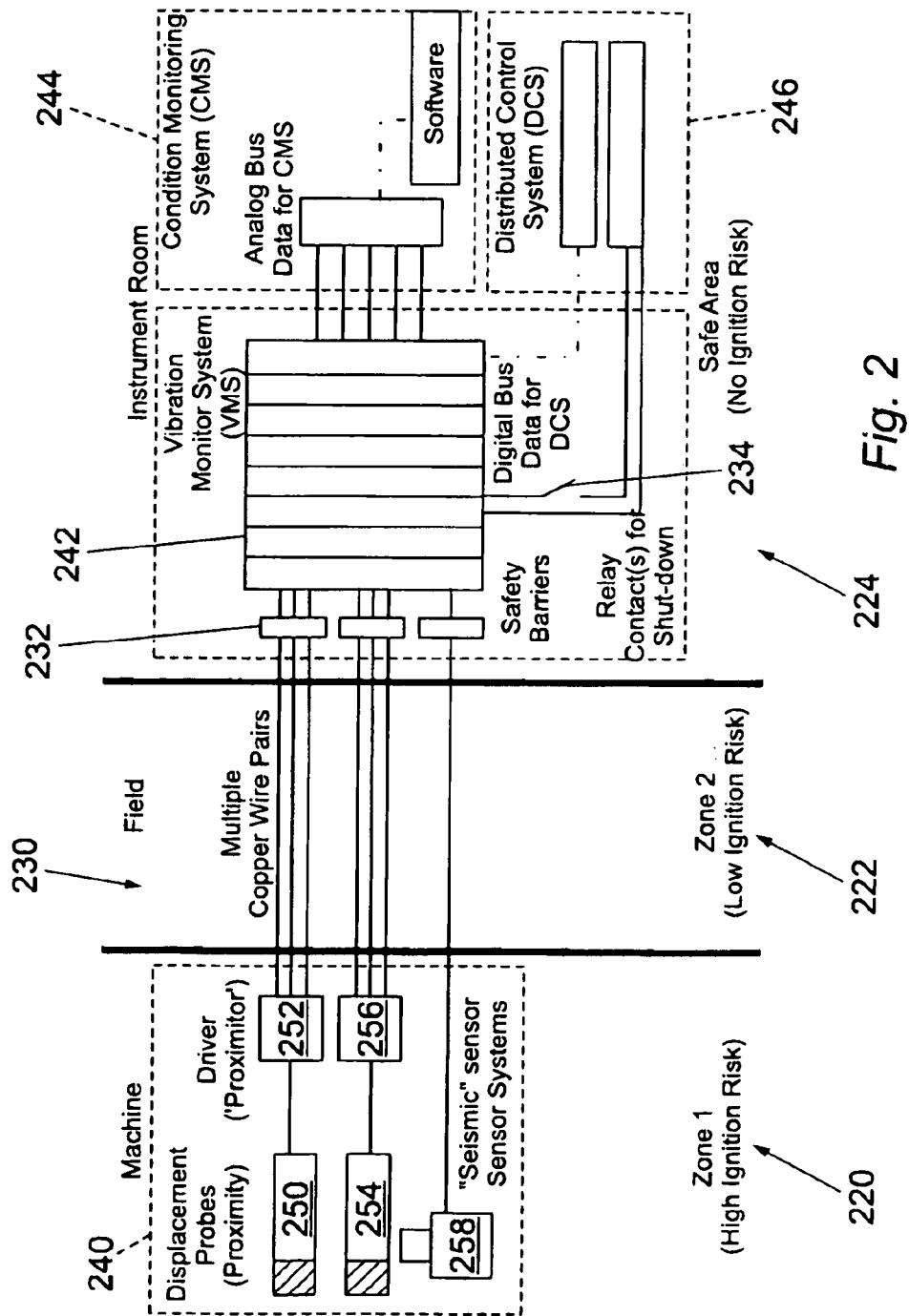
FIG. 2 illustrates an instrument room based vibration and condition monitoring system.

A driver as described above, or a conventional analog driver, can be implemented in an instrumentation room based system as is illustrated in FIG. 2. There is a need to monitor vibration on critical machinery in high ignition risk environments, such as they exist in the energy sector, for example the oil & gas business, for the purposes of automatic shut-down and long-term equipment health, condition, monitoring. In high ignition risk industries such as the oil & gas business the control room is designated a safe area with respect to flammable gases.

FIG. 2 illustrates, the instrument-room 224 based technology. Vibration sensors 250, 254, 258 of a variety of types are mounted on the machine 240 in the Zone 1 220 area. The probes that need a driver, for example eddy current probes 250, 254, can use an inventive driver 252, 256 as described above. A driver is also known as a proximitor. Seismic sensors 258 measure surface vibration in either acceleration or displacement, and often do not require a driver.

Each sensor 250, 254, 258 is connected via multiple copper wires 230 to a Vibration Monitoring System (VMS) 242 located in the safe area 224. In between are safety barriers 232 (one per sensor) to isolate the hazardous area 220, 222 from the safe area 224. The VMS provides power and signal conditioning to the sensors, and then measures the signal/vibration levels. In the event of excessive vibration levels, the VMS provides a instant shut-down command (via one or more relay contact closures 234) to an external Distributed Control System (DCS) 246 device, in order to stop the machine. The value of the vibration level—per sensor—is transmitted in parallel to the DCS by a digital data bus link, using a public protocol.

For long-term health monitoring the same sensor signals are re-transmitted via analog bus to a separate Condition Monitoring System (CMS) 244 in the safe area 224 for data acquisition, data processing and then to computer software for storage & display.

Figure 3:
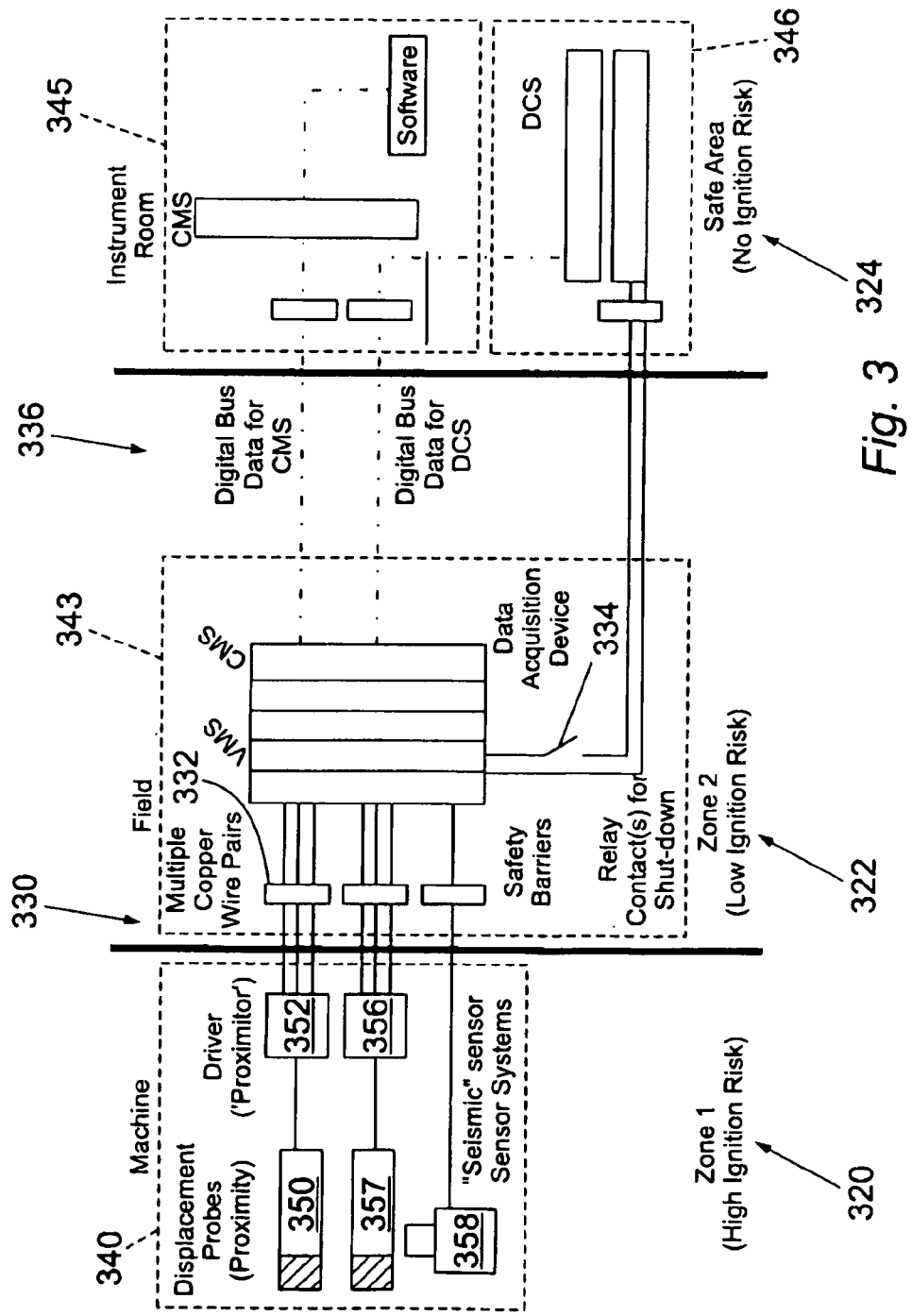
FIG. 3 illustrates a machine based vibration and condition monitoring system.

A driver as described above, or a conventional analog driver, can be implemented in a machine based system as is illustrated in FIG. 3. In many businesses/industries, such as the oil & gas business, a machine 340 is designated a 'hazardous area' with respect to flammable gases—divided into 'zones' 320, 322 of ignition or similar.

In this type of system each sensor 350, 352, 354, 356, 358 is connected via multiple copper 330 wires to a Vibration Monitoring System (VMS) 343 located near the machine in a lower risk Zone 2 area 322. In between are safety barriers 332 (one per sensor) to isolate the high risk area 320 from the low risk area 322. The field-VMS provides power and signal conditioning to the sensors, and then measures the signal/vibration levels. In the event of excessive vibration levels, the VMS provides an instant shut-down command (via a one or more relay 334 contact closures) to an external Distributed Control System (DCS) device 346, in order to stop the machine. The value of the vibration level—per sensor—is transmitted in parallel to the DCS by a digital data bus link 336, using a public protocol.

For long-term health monitoring the Condition Monitoring System (CMS) 345 for is divided: data acquisition occurs in the Zone 2 area 322 along with the VMS, and then digitized data is sent across a data-bus link to the safe area 324, where it is processed, and then to computer software for storage & display. The protocol for this link is either public or proprietary.

These system architectures, as illustrated in FIGS. 2 and 3 are predominantly centralized. When employed to monitor machinery located in the hazardous explosive environment of for example the oil & gas business, this type of architecture has a number of drawbacks. First of all Protection devices, such as zener barriers, or other protective measures, such as explosion proof housings, are required, and add to both the overall cost and reliability risk of the overall system. Secondly individual sensor wiring is required from the hazardous area to the monitoring instrument located in an electrically safe area. There are many terminations and connections, and each one needs to be verified during machine package installation, and possibly during subsequent maintenance or trouble-shooting. This adds to both the overall cost and reliability risk of the system. Thirdly the present technology of vibration sensors necessitates the use of low voltage, e.g. 100 millivolts, signals as an output. The distance over which these analog signals can be transferred, between machine and monitor system, without signal degradation, is limited. The electrical properties of applicable instrument field cables restrict the maximum distance to around 500 m. Fourthly intrinsically safe control system input/output (I/O) instrumentation for rotating machinery is increasingly available and can be located in the hazardous area local to the machine. The I/O is 'distributed' around the plant as the machines are 'distributed' around the plant. However this I/O is confined to the measurement of common 'process parameters' such as temperature, pressure and flow-rate. The current nature of vibration systems on the market largely excludes the parameter of vibration from this I/O, precluding commonality and adding to the overall cost and reliability risk of the system.

Any electrical device located in a hazardous area must be designed such that—in the event of a component failure—an ignition source (e.g. spark) is either impossible or contained, and cannot reach the flammable gas. The electrical design must be audited and certificated—by an independent body—against international standards & codes of practice.

The concept of an intrinsically safe monitoring and protection system with a distributed nature according to the invention resolves all these disadvantages. To enable the invention, the eddy current driver according to the invention described above, or other driver designs, are integrated with digital signal processing to thereby form a complete unit integrating vibration monitoring and part of the condition monitoring, that communicates over digital signal lines according to the invention to the distributed control system and a central condition monitoring part. This unit can comprise a plurality of drivers and inputs for sensors not requiring drivers.

Analog systems, as described above, mainly comprise three separate components to form an eddy current system—a displacement probe, a cable and an oscillator/demodulator, usually known as a driver or proximitor. The probe driver performs probe activation/excitation and in many cases also analog signal linearization and some signal conditioning, to be ready for input to an external monitoring and protection system device. If the driver comprises analog circuitry for linearization and signal condition for a variety of eddy current displacement probe types, the driver becomes very complex.

Depending upon the intended monitoring application, the eddy current probe system design needs to adapt to numerous parameter changes. These variables include, but are not limited to, displacement probe size, cable length, target material, and required output sensitivity. Another principal limitation in the operational concept of the eddy current probe measurement is that it is not feasible to use long distances with coaxial cable between probe and the final signal conditioning—i.e. a direct connection from the probe mounted in the machine to a centrally located monitoring system, perhaps several hundred meters away. The present operational principles limit this distance to around 15 meters. Hence the use of a stand-alone driver to perform the required conditioning within an acceptable distance from the probe.

A digital driver will improve the flexibility of a single eddy current probe system design, as opposed to the component variety of the fixed parameter based analog design. However, a digital driver—as a stand-alone product—will in general remain static once a linearization curve has been established for an eddy current probe system. Subsequently, the available signal processing power, used to establish the curve, remains unused but the component cost remains. The cost of analog to digital conversion, digital signal processing and then digital to analog conversion to allow interfacing with standard, analog input based, monitoring and protection systems, would result in a commercially non-competitive product compared to proven analog designs.

With the introduction of distributed condition and protection monitors local to the machine according to the invention, the final signal conditioning can be performed within the distance limitation of the ECP system, and the need for individual sensor wiring to remote monitoring and protection systems is eliminated. This invention, based upon the predominantly digital signal processing character of a distributed monitoring and protection module, therefore includes the driver signal conditioning hardware into the product, and utilizes the digital signal processing power for the required linearization in a more cost effective manner, as the main function of digital signal processing is continuous monitoring and protection function of connected sensors. An additional effect of the inclusion of the driver hardware into the invention is the full elimination of any required digital to analog conversion and copper wire interface between driver and monitor, thus optimizing cost, effectiveness and overall system quality and reliability. Adding further to reliability, this system also monitors the presence of the RF probe excitation signal in addition to the common DC output level probe OK monitoring of the driver output. Therefore, the invention provides a higher diagnostic coverage, in addition to regular DC based OK monitoring, for probe system failures. Configuration software will allow for in-situ calibration and linearization of directly attached displacement probe types and various cable lengths (tailored to the needs of different applications).

The system according to the invention allows an overall system cost reduction by excluding the need for separate analog driver system. The certification that permits location and operation of the invention—including integrated eddy current probe driver signal conditioning—in a Zone 1 hazardous area on the machine base itself is optimized by hardware integration for distributed use. Increase the reliability and reduce maintenance issues by support for flexible, but restricted, displacement probe cable lengths using a single driver device. Increase reliability and reduce maintenance issues by support for different make and type of displacement probes using a single driver device. There is also according to the invention a software-driven in-situ calibration and linearization option.

Figure 4:
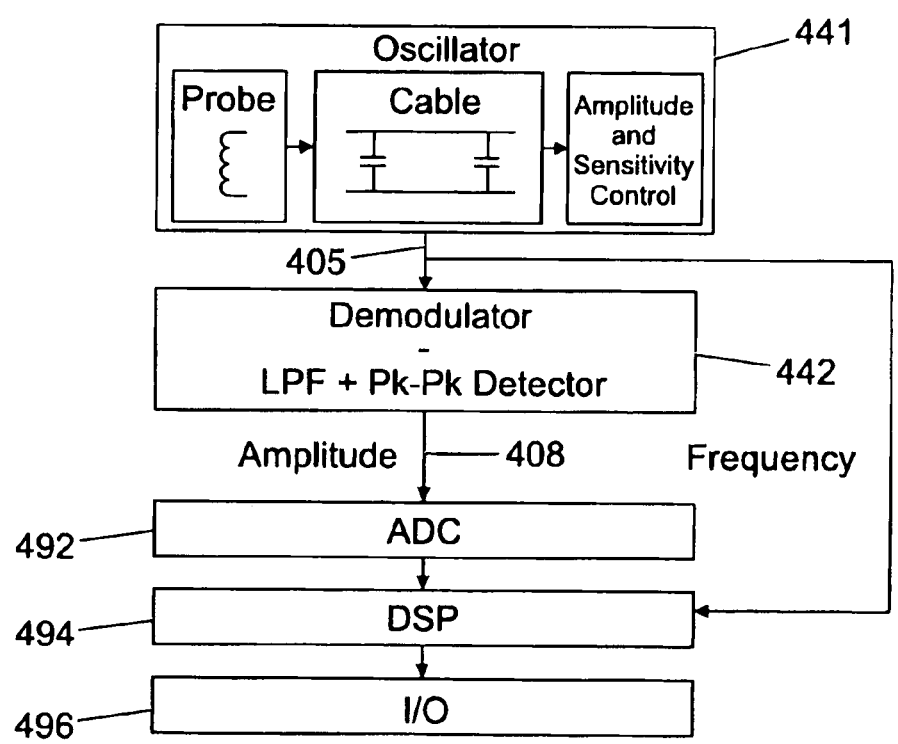
FIG. 4 illustrates a block diagram of a digital driver according to the invention.

FIG. 4 illustrates the major parts of the distributed part of a distributed vibration and condition monitoring system according to the invention. The distributed part comprises one or more eddy current probe interfaces to thereby make up the oscillator 441 part which in turn delivers a high frequency output 405. Following the output 405 of the oscillator 441 is a high-speed peak-peak detector 442 to convert the dynamic high frequency output signal into an output signal 408 comprising a DC voltage representing the gap between probe and target and a superimposed low frequency signal up to about 10 kHz representing the shaft vibration signal. This demodulated and peak to peak detected output signal 408, is thereafter analog to digital converted in an AD converter 492 before the then digital signal is brought into the digital signal processing part 494. After processing and data reduction according to the invention, explained in detail below, data is transmitted via an I/O interface 496 to a distributed control system for shut-down control.

One approach to perform probe function monitoring for eddy current probe systems is to monitor the DC gap voltage. However this method of detection depends not only on the probe/cable but also upon proper operation of a substantial amount of electronic circuitry such as the oscillator, peak to peak detector. This method cannot therefore be 100% conclusive in identifying actual malfunction of the probe and/or cable interface. In addition this approach is particularly ineffective in thrust monitoring applications where the DC gap measurement is both the measurement parameter and the probe control measure. Hence the system is unable to distinguish between a simple out of range and actual component failure. Correct function detection according to the invention based on oscillation frequency provides such a distinction and if employed together with DC voltage monitoring allows for the detection and identification of both out of range and failure. In this situation the oscillation frequency can be monitored and in the event this is outside an expected range a probe or (oscillator) circuit failure can be determined at an earlier stage. The high frequency signal 405 is therefore connected to the digital signal processing part 494 for frequency measurement and thereafter range checking. This method will therefore positively contribute to a more reliable and redundant method for probe function monitoring.

Furthermore, when monitoring the actual oscillation frequency, one can compare the response with predefined specific probe system data. Different probe types may operate at various oscillation frequencies. When a frequency deviates from a predefined range, this will indicate a mismatch between configuration and probe type and can be used to prevent possible shutdown as result of human error, i.e. use of a wrong probe type or a wrong configuration. Similar, for a correct configuration, a warning can be issued when the frequency and/or the amplitude response moves away from a nominal operating value, indicating that the impedance is changing as a result of physical changes to the system, i.e. change of probe coil characteristics as a result of environmental conditions. In addition to the frequency monitoring—during system setup—the infinitive gap response can be compared against expected values. In case the oscillation frequency is as expected but a significant change is identified in amplitude response this will identify a cable with different cable characteristics and will therefore require new calibration information, i.e. a replacement of an extension cable with a different characteristics than the previous version.

Based upon the ability of frequency and amplitude monitoring advanced impedance correction techniques, in principle similar to the next described linearization techniques according to the invention, can be used to compensate for non probe-target distance related system characteristic changes, such as resistive probe cable losses.

Due to non-linear behavior of the probe position response, output signal processing is required to obtain a linear response. The probe/cable impedance is directly related to the probe type, the probe position, the cable parameters, the cable length, and the target material. Based upon experience there is no need for accommodating automatic methods to respond to different target materials etc. Linearization is based upon known target materials, probe types and cable characteristics and will accommodate for a practical range of cable lengths. However, prior to linearization, a compensation method, similar to the later described linearization method, can be utilized to accommodate for small variances in systems components, like probe and cable parameters, of which the latter includes variances in center conductor which highly affect the output tank impedance value. These methods allow for elimination of the need for individual component trimming, probe cable, extension cable and driver, and therefore reduce field calibration and maintain a high level of inter-product replacement ability. In the event that system characteristics have changed significantly the system allows for system recalibration based upon factory originated linearization calibration data. There is no need for in-field system calibration. The main field requirement is to obtain the infinite gap response of the probe prior to installation. The unit stores probe identification information in case these tasks are executed prior to final system installation. Measured infinite gap response is used as a basis to determine the actual sets of coefficients required for executing the compensation of the impedance measurement voltage and linearization of the result thereof. However, there are no given restrictions to execute a specific field calibration to obtain linearization coefficients for a specific eddy current probe system, i.e. target material, probe type and cable length.

Figure 5:
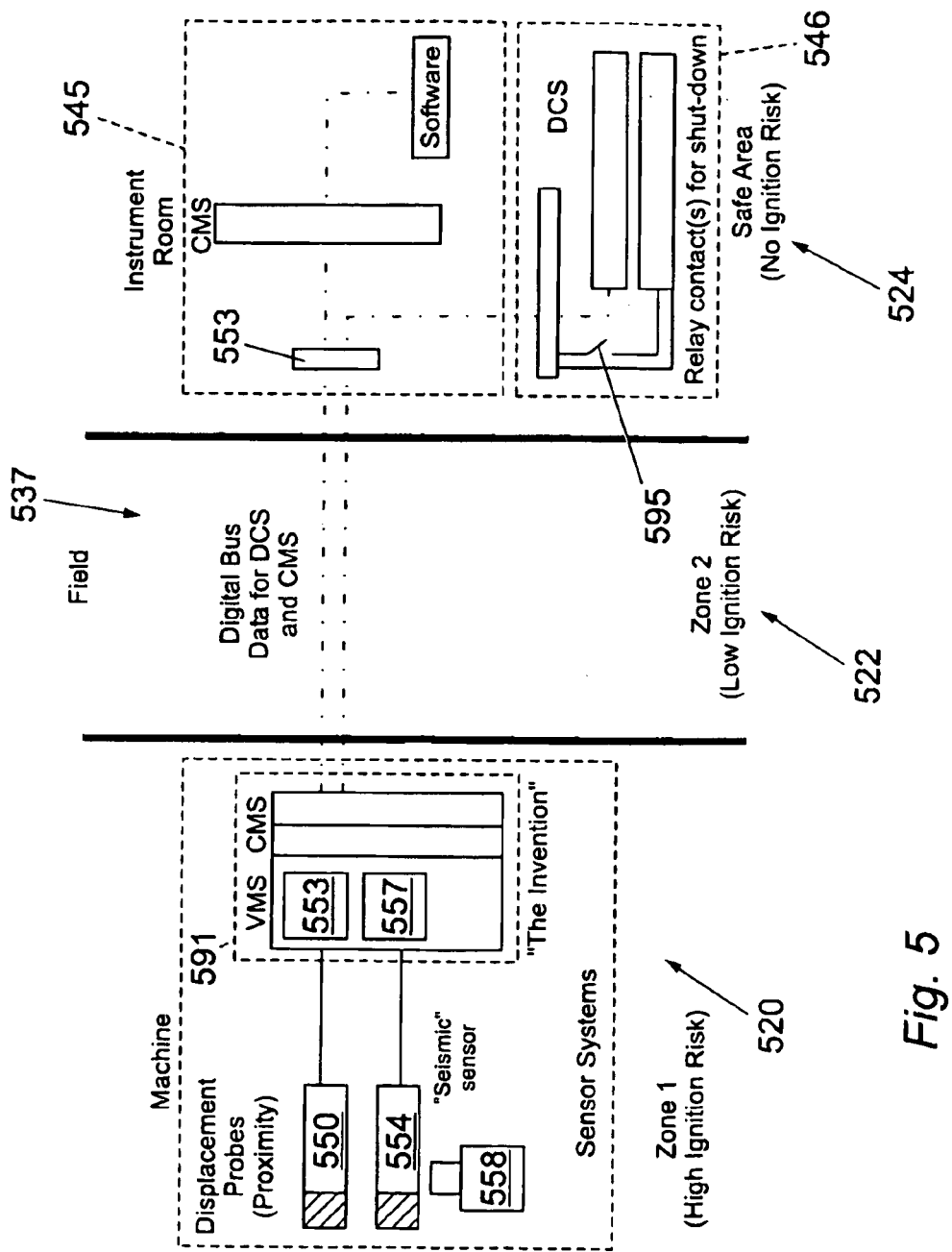
FIG. 5 illustrates a distributed vibration and condition monitoring system according to the invention.

Going back to the system level, FIG. 5 illustrates a distributed system according to the invention. Vibration sensors 550, 554, 558 of a variety of types are mounted on the machine in the Zone 1 area 520, and each is connected directly to an instrument device 591 according to the invention mounted in Zone 1 520 on the machine's base as described above. The distributed unit according to the invention incorporates a digital, programmable driver or proximitor 553, 557 for each displacement probe 550, 554, and can also connect to other sensors 558 such as seismic sensors. The distributed unit 591 according to the invention provides power and signal conditioning to the sensors, and then digitizes and measures the signal/vibration levels. In the event of excessive vibration levels, the distributed unit according to the invention provides an instant shut-down command via a digital opto-isolated 533 data-bus link 537 to an external Distributed Control System (DCS) device 546, in order to stop the machine. The digital signals can be read directly by the distributed control system, or converted to a relay 595 output in the safe area 524. The value of the vibration level—per sensor—is also transmitted to the distributed control system by the same data-bus link, using a proprietary protocol through the hazardous areas 520, 522, and then translating to a public protocol in the safe area 524. For long-term health monitoring the Condition Monitoring System (CMS) 545 is divided into two. First a data acquisition occurs in the Zone 1 area 520 along with the VMS 591, and then digitized data is sent across a second data-bus link to the safe area, where it is processed 545, and then to computer software for storage & display. The protocol for this link is proprietary. The summary of the invention is that it combines the functionality of the Oscillator/Demodulator, VMS and CMS, into one device 591 that is also safe to be located in the high risk Zone 1, or equivalent. The monitoring hardware platform can be tailored to the functional needs (monitoring, protection or combination of both) of each machine type or manufacturer, by means of embedded software (firmware), without reference to external influences. The built-in digital driver technology eliminates the separate analog oscillator/demodulator used with displacement probes and provides a single, programmable, means of accommodating the electrical requirements of a variety of probe designs. This reduces the overall component variation within the system, increasing reliability and reducing cost. The invention provides the means for future application development located within the hazardous area, e.g. in-situ balancing of rotating equipment in a zone 1 environment. The use of digital communication links according to the invention to send data to the outside world for vibration level information and shutdown commands and vibration data for condition monitoring and analysis purposes, eliminates the need to install and verify many copper wire cables and connections in the field between the machine and the instrument room.

There are a number of restrictions for equipment in an intrinsically safe (IS) environment. These restrictions are solved according to the invention, to thereby enable the distributed system according to the invention. No local physical relays are allowed. Despite the fact that optical outputs are allowed in an IS environment and used within the distributed unit, this will result in per alarm channel wiring into the safe area using appropriate isolators or barriers, thus jeopardizing the fully distributed concept. Therefore, redundant high speed, isolated, multi-drop serial RS485 communication lines are provided to allow for secure and priority alarm message transmission to further handle shutdown data remotely in either digital form or redirect to a physical relay. Current use of the RS485 physical layer is the state of the art option for IS approved wire-based communication links. Due to specific requirements for communication handling the used protocol will be proprietary. No local buffered outputs are allowed. Absence of local buffered outputs prevents methods for periodical condition monitoring capabilities, i.e. using a hand-held analyzer device. To allow for some level of condition monitoring, internal data processing for protection monitoring purposes is based upon FFT spectrum analysis. Measurement data can be periodically made available, by means of a second communication link using lower priority than alarm data communication, to the remote central condition monitoring analysis system. Related to this is the fact that due to digital driver incorporation in the distributed unit there is no analog dynamic driver output signal available for buffered output purposes. Local power and temperature restrictions are in place. As a result of power restrictions, low power electronics are required for the device. Consequently the DSP processing power is also restricted as more processing power requires a higher operating frequency which in turn results in a higher current consumption and a higher component body temperature. Therefore, optimized data processing and communication routines are required in order to meet continuous protection response and associated level of status communication, with sufficient level of condition monitoring capabilities, i.e. FFT band values can serve as low level transient capabilities during run-up/rundown conditions, priority message scheme for module alarm control and status. All this within further processing power restriction opposed by the need for a redundant communication system. There is also a local access restriction. For module configuration and reconfiguration there is no direct and desired means to allow local access for communication. Therefore the system communication link can be used for module configuration. However, to ensure optimized bandwidth availability for other active modules within the system, a set of local—pre-configured—configuration sets, for example 20 each, are available which can be activated by a simple command. This method allows configuration for a fully distributed system under full control of the remote process control system and doesn't necessarily require specific configuration software. There is an I/O energy limit. All active in- and outputs will require sufficient level of energy limitation and ensure full galvanic isolation between modules. For this purpose IS barriers are fitted in the design and full isolation is provided for power supply input and dual RS485 serial communication interfaces.

The following measures have been taken to meet the IS requirements and being able to combine reliable protection functionality together with appropriate level of condition monitoring requirement within a single 4-channel device:

Operating clock speed of the used DSP at a lower rate than maximum rated clock speed to stay within IS current limit with sufficient headroom to allow for processing power variations as a result of firmware enhancements. Due to the low clock speed and directly associated reduced processing power availability, special algorithms have been implemented to handle protection functions within a so-called Inner Loop which is setup independent and provided with an update rate on all four channels well within the 100 msec API670 protection system requirement. All related condition monitoring functionality, such as FFT calculation, and normal communication events will be handled in an Outer Loop, which update rate consequently is proportional to the used setup, including for example sampling rate, FFT enabled and digital filtering. The outer loop is thus allowed to run only when the inner loop is not running.

Apart from the hardware measures done to minimize current consumption of the communication circuits, additional measures according to the invention are provided in firmware to keep the maximum current for the communication circuits within IS limits. According to the invention the firmware inhibits parallel data transmission in order to prevent the need for current limiting to support both communication lines and thus lower total current budget. If current limiting cuts in that could result in communication message failures. Thus only one data transmission channel is operated at a time. Both communication lines are open for input. The firmware according to the invention will queue incoming messages and interleave the message response. This method is based upon message based Tx switching as where future Tx byte switching will be implemented to further optimize the communication response time.

Fast Messaging communication method. This option provides means to transfer selected number of measurement values and overall alarm status information in a single short message of which the request will be handled by the module at a high priority in the Inner Loop processing. As a result of limited processing power and despite the fact that communication hardware is capable of higher communication speeds up to 1.5 MB, the overhead of communication interrupts will absorb too much DSP processing resources. Therefore, the fast messaging method, allows for short and high priority data acquisition means with acceptable overall system update rate for multiple modules using serial communication link. Handling in the inner loop will guarantee a response time of maximum 70 msec (typically 10-15 msec) opposed to response time of outer loop that strongly depends on setup.

An important aspect of the distributed system according to the invention is the fast messaging method according to the invention. It ensures that bi-directional data can be exchanged between a safe-area controller and the hazardous area mounted distributed units/modules in a timely manner consistent with system alarm & control requirements, including shutdown protection. Its main features are short outgoing message (combined command & write data), for example 6 bytes, and a longer return message, for example 37 data bytes. The outgoing message from the control system to the distributed units may contain 6 data bytes (in one implementation, up to 4 bytes are currently used). There is first an alarm word (2-bytes) having bit wise controls for alarm reset, alarm multiplier activate, and 5 (individual) alarm bypass controls. Thereafter there is another output word (2-bytes) having bit wise controls on a per channel basis to initiate calibration routines, DC gap zeroing and provision for global controls to trigger data storage functions such as "freeze" waveform data.

Longer return message, 37 data bytes, containing both bit wise data and 5 bit wise alarm status codes and scaled integer values. Both measures are aimed at minimizing byte count and therefore time for transfer. Word 1, bytes 1-2 (2-bytes) comprises bit wise indication of individual TX status, of any calibration in progress, any alarm disabled, any alarm bypassed, of the module variant and of the trip multiplier status. Word 2, bytes 3-4 (2-bytes) comprises as per alarm word above, this indicates current settings for all alarm related controls (reset, multiplier, bypass and logic bits). Words 3-16, bytes 5-32 (2-bytes each) comprise fourteen user configurable data words, each representing a measurement made by the module. The choice of measurement type (rms, peak, FFT band rms, FFT band frequency, speed etc) and of the source channel is completely open to the user or system configurator. This currently amounts to over 80 different measurement possibilities. Bytes 33-37 comprise five alarm status bytes representing a bitwise status of the alarm condition of applicable alarm configuration.

To ensure fast message turn-around, the incoming command is recognized as a fast message according to the invention by the module and processed at a higher priority than other communications commands. In principle the compact message lengths mean that at 115.2 kbaud, it would be possible to interrogate up to 32 modules on one multi-drop link within a 500 mS cycle time. For further optimization of the alarm data query process, the fast message may be programmable with respect to the message data length. For the general case the message can be limited to alarm status only, and thus significantly reduce the amount of data required for overall value data transfer and consequently allow for system status update rates of less than 100 mS cycle time, thus meeting API670 response requirement. Foreseeable is also the implementation of this communication scheme in a separate Gateway device (also IS) as being master for the serial communication to linked modules.

As a consequence of IS restrictions like energy limitations and full galvanic separation between modules, this imposes restrictions on the maximum bandwidth available for data communication. Bandwidth costs processing which in turn costs power. Given the need that alarm data needs to be communicated for multiple units with a given response time restrictions for executing the protection function. Normal communication protocol for multi-drop configuration is based upon a master/slave protocol. The central remote system requests data from a slave and the applicable slave replies. For effective request processing within the module, the identified fast messaging is created to handle these short update requests with high priority without significantly interrupt normal data acquisition and processing. The concept of a dynamic communication protocol is to provide means for the individual module to change the type of response depending on individual module condition and functional use of both available communication interfaces under full control of individual modules (i.e. a communication link may only fail for a single module due to an internal error, this should then not affect redundant operation of the other modules). The master, however, does need to adapt to communication status with respect to alarm voting for affected modules, and interpret message headers for the type of returned data.

Following are some examples that provide an indication of the different modes of operation and ability in a preferred system. A preferred system uses two physical bidirectional links, i.e. digital data lines, to transfer information to and from the modules and central. This is to have a certain amount of redundancy, controlled according to modes of operation outlined below.

1] No Alarms
Link 1: Master link for continuous query of module status conditions (no value data).
Link 2: Dual link for continuous query of module status conditions (no value data) interleaved with requests for value data (module status with data) for live data display purposes and trending, as also scheduled uploads of dynamic data.

2] Alarms Detected
Link 1: Master link for continuous query of module status conditions with value data for modules with channels in alarm (optimized method is to restrict message length to only channels in alarm.
Link 2: Dual link for continuous of module status conditions with value data for modules with channels in alarm, interleaved with requests for value data (module status with data for all channels) for live data display purposes and trending, as also scheduled uploads of dynamic data. In case of initial alarm condition, the dual message for alarm status reporting has priority above possible scheduled/requested secondary data transfer (until alarm message has been confirmed by host).
Remote Alarm processing: 2 out of 2 voting from both communication lines
Note: For optimized status reporting it is advised to also provide alarm status condition for detected alarm condition, which is still within alarm delay time period.

3] Link 1 Error
Link 1: Continuous reconnection process to allow for automatic functionality recovery once detected by the module. Upon detection of lost master communication link, switch master link module reply scheme to Link 2
Link 2: Continuous reconnection process to allow for automatic functionality recovery once detected by the module. Continuous query of module status conditions with value data for modules with channels in alarm. No trending or dynamic data upload depending of configuration.
Remote Alarm processing: 1 out of 1 voting from active communication lines
Allow user configurable option to allow data trending and dynamic upload in case of link error. Option will depend on application, as time critical shutdown may not always be required or less stringent than need for periodic data trending.

4] Link 2 Error
Link 1: Normal operation for link 1. No interleaved trending or dynamic data upload depending of configuration.
Link 2: Continuous reconnection process to allow for automatic functionality recovery once detected by the module.
Remote Alarm processing: 1 out of 1 voting from active communication lines
Allow user configurable option to allow data trending and dynamic upload in case of link error. Option will depend on application, as time critical shutdown may not always be required or less stringent than need for periodic data trending.

A proposed scheme for the flexible message handling is to use the data word in the fast messaging word to mark the request:
0: Status
1: Status and All channel values
2: Other data upload request Option 0 will only reply status in case module has no alarm, and will provide channel value for those channels that are in alarm. Reply message header shall identify type of reply. Option 1 will return full status data (live data request—once every x seconds, or trending—once every x minutes/hours). Option 2 will identify current module status and indicate option for additional data request, which then can be requested by applicable command initiated by Master on designated link. When not allowed, the master should not request this data (data server portion will then have to handle these controlled errors).

Opposed to the above, the following method is also being considered to mixing high priority and low priority data.

Currently sequential multiple long messages (8×260 bytes) will be required to transmit dynamic data. Once such a communication is started the process of changing priority of data link cannot be stopped (until complete sequence is completed, or when interruption after a 260 byte message is allowed). In order to optimize reaction time, it is possible to also handle the large data request by means of priority messages like the fast messages. Message length will be reduced (i.e. 40 bytes and therefore allowing faster switching from low to high priority switching.

Further features of the dynamic protocol principle, is the use of internal module alarm status conditions. In case a unit has no alarms, low priority messages can be handled in the most effective method. However, when an alarm is detected, but still in 'alarm delay validation phase' the module could prevent start/acceptance of data transfer and ensure a parallel transmission of this initial alarm status event. Furthermore, priority control can also be assigned to type of alarm level (alert, danger, etc.). Note that the above is more related to being capable of providing secure remote shutdown using a redundant communication link is more a functional requirement of which use of IS is only a side effect. Use of a redundant communication link enables the above identified examples of dynamic protocols. Use of isolated power supplies with output barrier and opto-isolated communication links will allow use of the communication hardware within IS environment.

Figure 6:
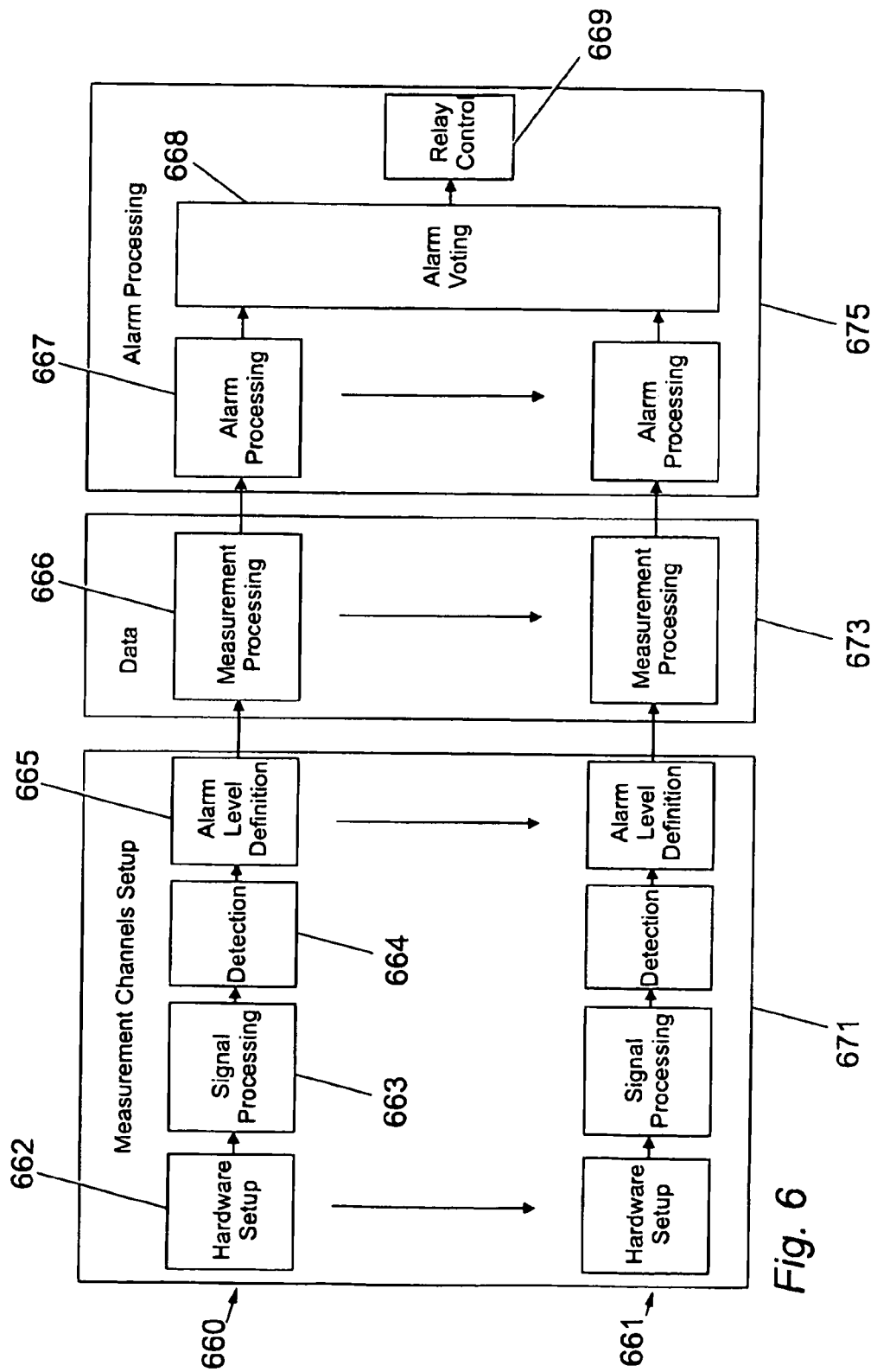
FIG. 6 illustrates a block diagram of a non-preferred alarm signal processing with separate parallel hardware channels.

FIG. 6 illustrates one non-preferred method for alarm data processing for protection and monitoring functionality. Each measurement channel 660, 661 setup defines a number of parameters. Hardware channel setup 662 (source), signal processing 663 (Filtering, Integration, etc.), detection method 664 (RMS, Peak, Peak-Peak, Scaled RMS, 1×, 2×, etc.), alarm type (Level, In Window, Out Window) and alarm level definition 665 are defined.

Following measurement processing 666 in the data processing 673, the measured value will be evaluated with respect to alarm setup (alarm processing 667) and will result in a True or False input which is used as input by the applicable alarm voting scheme 668 (AND, OR, Majority voting, 1 out of 1, 1 out of 2, 2 out of 2, etc. logical combinations) to obtain the control signal (True/False) that can be assigned to a physical relay output 669 and/or channel alarm status channel, all in the. Each hardware entry is one channel all the way through to the alarm voting. There are no synergies.

The distributed module according to the invention has implemented a different alarm setup and processing scheme to obtain more flexibility in the alarm setup. A key point is that the alarm definition is not tied to the measurement setup, but independently defined within the virtual alarm channel.

Figure 7:
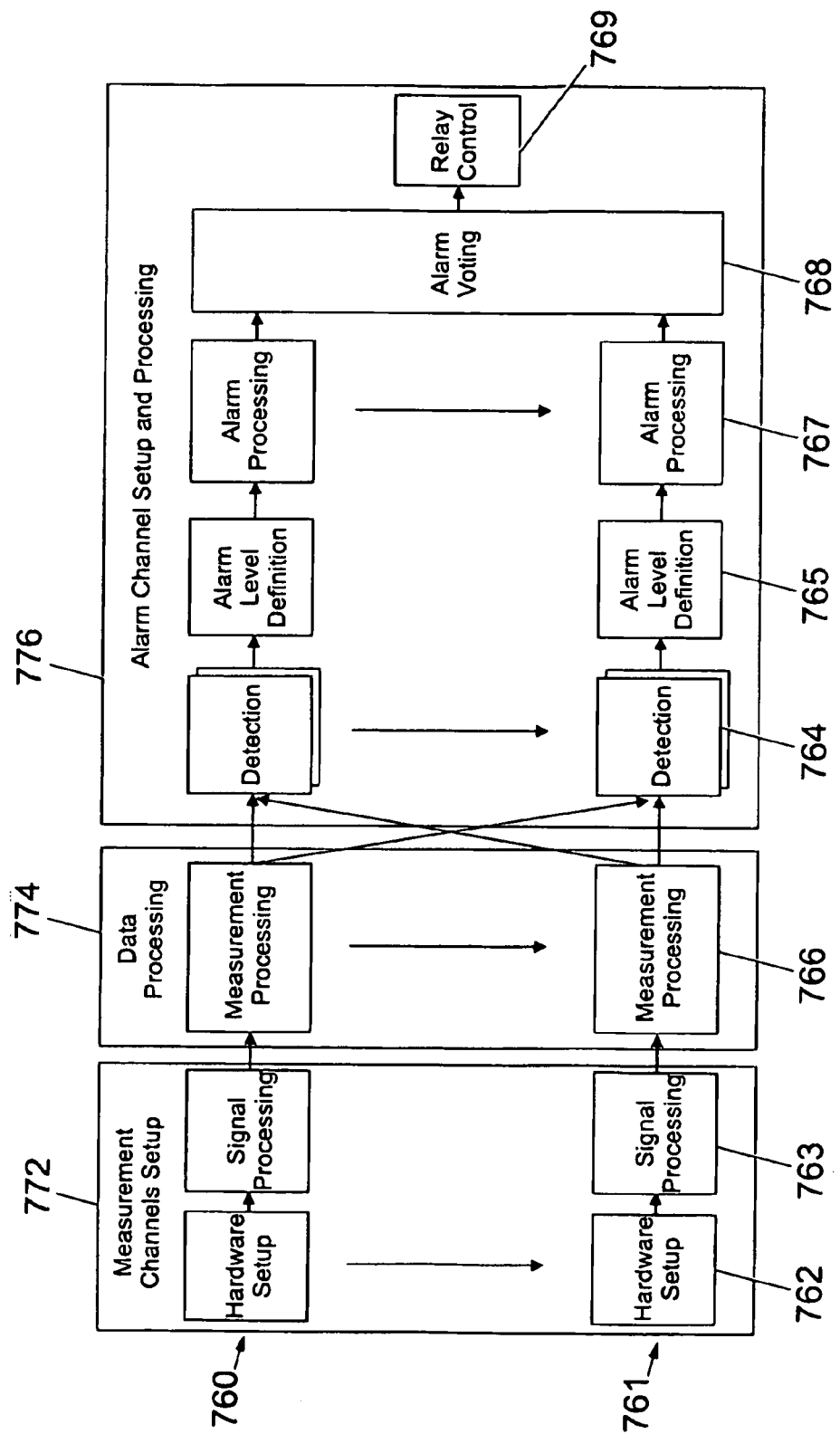
FIG. 7 illustrates a block diagram of an alarm signal processing with virtual intermixable channels according to the invention.

For this purpose, as can be seen in FIG. 7, the Detection 774 and Alarm Level definition 775 are moved out of the measurement setup section 772 and integrated into the Alarm Processing section 776. Another important difference is that equal measurement channel data can be used in parallel using different processing methods, as the distributed module will provide data results for all applicable processing options provided (RMS, Peak, Peak-Peak, Scaled RMS, 1×, 2×, etc.). Example: Channel A, with RMS detection and Level alarm 3g combined (AND voting) with Channel A using Peak detection and alarm 5g.

FIG. 7 provides a block diagram of the distributed module alarm-processing concept using virtual alarm channels 770, 771 according to the invention. Therefore, input for the alarm processing is not a True/False condition anymore, but a setup defining which hardware channel measurement value (processing) is to be used and applied to a designated alarm and voting process. Output result, again, will be a True/False condition that can be assigned to a (virtual) alarm condition status and/or to an opto-relay 769.

In order to optimize firmware design to cater for this fully flexible alarm channel setup and processing, a logic alarm table structure has been defined to describe the alarm input setup. A main advantage is that the firmware only has to parse the alarm logic table to generate the alarm processing code and therefore by itself do not require specific knowledge. Using this method the firmware is generic and knowledge is solely provided by means of alarm channel configuration data. Each virtual alarm channel, any logical combination (AND, OR) of up to 16 different parameters chosen from any type of measurement on any measurement channel, will therefore be described by such a logic table This scheme will currently cater for any logical combination of up to 16 parameters that can be described within a 64 line (masked) table using either sum of products or product of sums, representation. An enhancement would be to remove such items from code and have them loaded from an external file. This file could then be routinely updated with new alarm combinations without requiring any code change.

As an example of the alarm logic consider an alarm where two measurements are considered. Each is compared to a threshold and the alarm is to be set if either (or both) exceed their respective thresholds. In the configurator this alarm is described as:

Common alarm (any 1 from 2). Alarm on signal greater than threshold.

It is considered that there may be four similar alarms of this type:

Failsafe alarm condition=opto output state with no power applied alarms if TX not OK Non-failsafe alarm condition=opto output state with power applied will not alarm unless TX OK Power loss alarm condition=opto output state with no power applied TX OK state not considered Don't care alarm condition=opto output state with power applied TX OK state not considered As an example consider a failsafe alarm of the above type, its logic table would look like this:

|  |  | bit5 | bit4 | bit3 | bit2 | bit1 | bit0 |
|---|---|---|---|---|---|---|---|
|  |  | Measurement 3 | | Measurement 2 | | Measurement 1 | |
|  | << bit6 << | TX FAIL | threshld | TX FAIL | threshld | TX FAIL | threshld |
| 1$^{st}$ logic | — | — | — | — | — | — | 1 |
| 1$^{st}$ mask | 0 | 0 | 0 | 0 | 0 | 0 | 1 |
| 2$^{nd}$ logic | — | — | — | — | — | 1 | — |
| 2$^{nd}$ mask | 0 | 0 | 0 | 0 | 0 | 1 | 0 |
| 3$^{rd}$ logic | — | — | — | — | 1 | — | — |
| 3$^{rd}$ mask | 0 | 0 | 0 | 0 | 1 | 0 | 0 |
| 4$^{th}$ logic | — | — | — | 1 | — | — | — |
| 4$^{th}$ mask | 0 | 0 | 0 | 1 | 0 | 0 | 0 |

Logic 0 = 1 Mask 0 = 1
Logic 1 = 2 Mask 1 = 2
Logic 2 = 4 Mask 2 = 4
Logic 3 = 8 Mask 3 = 8
Horizontal: AND function
Vertical: OR function All measurements are considered in turn (threshold first then TX OK—for window alarms the convention adopted is lower threshold, upper threshold, TX OK). The mask line indicates which bits of the logic line are to be considered (thereby significantly reducing the number of different lines needed to describe an alarm). Use enough lines to ensure that the desired behavior of the alarm is fully described. Any (masked) logic line equating to true during module operation will cause the alarm to be set. The number of used lines is communicated to avoid unnecessary control line processing.

To illustrate further consider a similar alarm to the one above, but this time non-failsafe i.e. will not alarm unless TX OK. The logic table now looks like this:

|  | << bit6 << | bit5 Measurement 3 | | bit4 Measurement 3 | bit3 Measurement 2 | bit2 Measurement 2 | bit1 Measurement 1 | bit0 Measurement 1 |
|---|---|---|---|---|---|---|---|---|
|  |  | TX FAIL | thresh-old | TX FAIL | thresh-old | TX FAIL | thresh-old |
| $1^{st}$ logic | — | — | — | — | — | — | 0 | 1 |
| $1^{st}$ mask | 0 | 0 | 0 | 0 | 0 | 0 | 1 | 1 |
| $2^{nd}$ logic | — | — | — | — | 0 | 1 | — | — |
| $2^{nd}$ mask | 0 | 0 | 0 | 0 | 1 | 1 | 0 | 0 |

Now, this alarm is described by:
Logic 0=1 Mask 0=3
Logic 1=4 Mask 1=12

Thirty-two bits are available to describe up to 16 measurements (only the first seven are shown in above tables). Separate references (up to 16ea) are provided describing the each measurement input definition:

1. Measurement channel
2. Detection type
3. Alarm threshold
4. Alarm multiplier

Note that the alarm type is defined within the logical table. Example: In window alarm using levels Low and High is defined as Signal>Low AND Signal<High, which translates into: (Low=True) AND (High=False)

The invention is not restricted to the above-described embodiments, but may be varied within the scope of the following claims.

| FIG. 1 - illustrates a block diagram of a novel driver, |
|---|

| 102 | Probe, |
|---|---|
| 103 | Cable, |
| 105 | High frequency output signal from oscillator part, |
| 108 | Amplitude output signal from demodulator/peak to peak detector, |
| 141 | "Oscillator" part of driver, including probe and cable as these are a part of the complete oscillator, |
| 142 | Demodulator and peak to peak detector, |
| 152 | Driver according to the invention, |
| 190 | Excitation part of oscillator |

| FIG. 2 - illustrates an instrument room based vibration and condition monitoring system, |
|---|

| 220 | Zone 1 - High ignition risk - Machine area, |
|---|---|
| 222 | Zone 2 - Low ignition risk - Field area, |
| 224 | Safe area - No ignition risk - Instrument room area, |
| 230 | Multiple copper wire pairs, analog, |
| 232 | Safety barriers, |
| 234 | Relay(s) for shut-down, |
| 240 | Machine area, on it or in the proximity, |
| 242 | Vibration Monitoring System (VMS) located in an Instrument room, |
| 244 | Condition Monitoring System (CMS) located in an Instr. room, |
| 246 | Distributed Control System (DCS) located in an Instrument room, |
| 250 | A first Displacement Probe such as an Eddy Current Probe (ECP), |
| 252 | A first analog driver for the first probe, |
| 254 | A second Displacement Probe such as an ECP, |
| 256 | A second analog driver for the second probe, |
| 258 | Other sensors/probes, such as seismic sensors. |

| FIG. 3 - illustrates a machine based vibration and condition monitoring system, |
|---|

| 320 | Zone 1 - High ignition risk - Machine area, |
|---|---|
| 322 | Zone 2 - Low ignition risk - Field area, |
| 324 | Safe area - No ignition risk - Instrument room area, |
| 330 | Multiple copper wire pairs, analog, |
| 332 | Safety barriers, |
| 334 | Relay(s) for shut-down, |
| 336 | Separate digital data busses for CMS and DCS |
| 340 | Machine area, on it or in the proximity, comprising probes and drivers, |
| 343 | Vibration Monitoring System (VMS) located in the field (Zone 2), comprising partly Condition Monitoring System, |
| 345 | Condition Monitoring System (CMS) located in an Instr. room, |
| 346 | Distributed Control System (DCS) located in an Instr. room, |
| 350 | A first Displacement Probe such as an Eddy Current Probe (ECP), |
| 352 | A first analog driver for the first probe, |
| 354 | A second Displacement Probe such as an ECP, |
| 356 | A second analog driver for the second probe, |
| 358 | Other sensors/probes, such as seismic sensors. |

| FIG. 4 - illustrates a block diagram of a digital driver according to the invention, |
|---|

| 405 | High frequency output signal from oscillator part, |
|---|---|
| 408 | Amplitude output signal from demodulator/peak to peak detector, |
| 441 | "Oscillator" part of driver, including probe and cable as these are a part of the complete oscillator, |
| 442 | Demodulator and peak to peak detector, |
| 492 | Analog to digital converter, |
| 494 | Digital signal processing, |
| 496 | Input/Output interface. |

| FIG. 5 - illustrates a distributed vibration and condition monitoring system according to the invention, |
|---|

| 520 | Zone 1 - High ignition risk - Machine area, |
|---|---|
| 522 | Zone 2 - Low ignition risk - Field area, |
| 524 | Safe area - No ignition risk - Instrument room area, |
| 533 | Safety barriers, |
| 537 | Digital data busses between distributed module(s) in Zone 1 and safe area, |
| 545 | Condition Monitoring System (CMS) located in an Instrument room, |
| 546 | Distributed Control System (DCS) located in an Instrument room, |
| 550 | A first Displacement Probe such as an Eddy Current Probe (ECP), |
| 553 | A first analog driver for the first probe, integrated on distributed module, |
| 554 | A second Displacement Probe such as an Eddy Current Probe (ECP), |
| 557 | A second analog driver for the second probe, integrated in distributed module, |
| 558 | Other sensors/probes, such as seismic sensors. |
| 590 | Distributed module, on machine or in the proximity, comprising probes and drivers, the local vibration monitoring system, part of the condition monitoring system and digital communication means to the safe zone, |
| 595 | Relay(s) for shut-down, remotely controlled by the distributed module via the redundant digital data buses. |

| FIG. 6 - illustrates a block diagram of a non-preferred alarm signal processing with separate parallel hardware channels, |
|---|

| 660 | First channel |
|---|---|
| 661 | Second channel |
| 662 | Hardware setup - source |
| 663 | Signal processing - Filtering, Integration, etc. |
| 664 | Detection - RMS, Peak, Peak-Peak, Scaled RMS, 1X, 2X, etc. |
| 665 | Alarm type and Alarm level definition - Level, In Window, Out Window |
| 666 | Measurement processing |
| 667 | Alarm processing |
| 668 | Alarm voting - AND, OR, Majority voting, 1 out of 1, 1 out of 2, 2 out of 2, etc. logical combinations |
| 669 | Relay control |
| 671 | Measurement channels setup |
| 673 | Data |
| 675 | Alarm processing |

-continued

FIG. 7 - illustrates a block diagram of an alarm signal processing with virtual intermixable channels according to the invention,

| | |
|---|---|
| 760 | First channel |
| 761 | Second channel |
| 762 | Hardware setup - source |
| 763 | Signal processing - Filtering, Integration, etc. |
| 764 | Detection - RMS, Peak, Peak-Peak, Scaled RMS, 1X, 2X, etc. |
| 765 | Alarm type and Alarm level definition - Level, In Window, Out Window |
| 766 | Measurement processing |
| 767 | Alarm processing |
| 768 | Alarm voting - AND, OR, Majority voting, 1 out of 1, 1 out of 2, 2 out of 2, etc. logical combinations |
| 769 | Relay control |
| 772 | Measurement channels setup |
| 774 | Data processing |
| 776 | Alarm channel setup and processing |

The invention claimed is:

1. A method of combining a vibration protection system and a condition monitoring system in an intrinsically safe module for a zone 1 or equivalent environment, comprising the steps of:
providing an intrinsically safe module including a digital signal processor adapted to process measurements from at least one eddy current probe protection functions which are run in an inner loop of the digital signal processor, condition monitoring functions which are run in an outer loop of the digital signal processor and at least two communication line connections to a central unit; and
allowing the outer loop to run only when the inner loop is not running.

2. The method according to claim 1, further comprising the step of:
activating only one communication line at a time for transmission.

3. The method according to claim 1, further comprising the step of:
bit encoding high priority messages transferred on a communication line.

4. The method according to claim 1, further comprising the steps of:
preconfiguring the module with a plurality of full configurations, and
selecting by the central unit by a compact message which preconfigured full configuration that is to be used.

5. A vibration protection and condition monitoring system arranged to monitor at least one rotating part using measurements from at least one eddy current probe, the rotating part being located in a Zone 1 environment, the system comprising:
an intrinsically safe distributed unit located proximal to the at least one rotating part, the intrinsically safe distributed unit including a digital signal processor, the vibration protection system being arranged to process the measurements digitally to thereby create an alarm signal and being arranged to digitally transfer the alarm signal via a doubled digital data bus communication line to a machine shutdown controller, the intrinsically safe distributed unit further including at least a part of the condition monitoring system,
wherein protection functions of the vibration protection system are run in an inner loop of the digital signal processor, and condition monitoring functions of the condition monitoring system are run in an outer loop of the digital signal processor, the outer loop being allowed to run only when the inner loop is not running.

6. The vibration protection and condition monitoring system according to claim 5, wherein the intrinsically safe distributed unit is arranged to be located in a Zone 1 environment or an equivalent, and the machine shutdown controller is located in a safe Zone.

7. The vibration protection and condition monitoring system according to claim 5, wherein the intrinsically safe distributed unit activates only one communication line at a time for transmission.

8. The vibration protection and condition monitoring system according to claim 5, wherein the system bit encodes high priority messages transferred on a communication line.

9. The vibration protection and condition monitoring system according to claim 5, wherein the intrinsically safe distributed unit is preconfigured with a plurality of library sets, and the system selects which preconfigured library set or sets that are to be used by a compact message.

10. The vibration protection and condition monitoring system according to claim 5 wherein the intrinsically safe distributed unit further includes a measurement setup section and an alarm processing section, and wherein the alarm processing section is separate from the measurement setup section and makes use of virtual alarm channels.

11. The method of claim 1, further comprising:
receiving incoming messages from a plurality of sensors via a plurality of data communication lines;
queuing the incoming messages; and
accepting one of the incoming messages at a time, so as to inhibit parallel data transmission.

12. The method of claim 11, further comprising interleaving responses to the incoming messages, so as to further inhibit parallel data transmission.

13. The method of claim 12, wherein an update rate of the inner loop is setup independent and wherein an update rate of the outer loop is proportional sampling rate, FFT enabled and digital filtering, or both sampling rate and filtering.

* * * * *